(12) United States Patent
Wetherall et al.

(10) Patent No.: US 7,970,886 B1
(45) Date of Patent: Jun. 28, 2011

(54) DETECTING AND PREVENTING UNDESIRABLE NETWORK TRAFFIC FROM BEING SOURCED OUT OF A NETWORK DOMAIN

(75) Inventors: David J. Wetherall, Seattle, WA (US); Stefan R. Savage, Seattle, WA (US); Thomas E. Anderson, Seattle, WA (US)

(73) Assignee: Arbor Networks, Inc., Chelmsford, MA (US)

( * ) Notice: Subject to any disclaimer, the term of this patent is extended or adjusted under 35 U.S.C. 154(b) by 680 days.

(21) Appl. No.: 09/706,503

(22) Filed: Nov. 2, 2000

(51) Int. Cl.
*G06F 15/173* (2006.01)

(52) U.S. Cl. .......................... 709/224; 709/225; 709/229

(58) Field of Classification Search .................. 709/224, 709/225, 229; 713/201; 707/10, 2, 20; 726/23
See application file for complete search history.

(56) References Cited

U.S. PATENT DOCUMENTS

| | | | | |
|---|---|---|---|---|
| 5,293,379 A | * | 3/1994 | Carr | 370/474 |
| 5,430,709 A | * | 7/1995 | Galloway | 370/241 |
| 5,473,599 A | * | 12/1995 | Li et al. | 370/219 |
| 5,623,600 A | | 4/1997 | Ji et al. | 395/187.01 |
| 5,835,722 A | * | 11/1998 | Bradshaw et al. | |
| 5,850,388 A | * | 12/1998 | Anderson et al. | |
| 5,878,420 A | * | 3/1999 | de la Salle | 707/10 |
| 5,884,033 A | * | 3/1999 | Duvall et al. | |
| 5,949,757 A | * | 9/1999 | Katoh et al. | 370/232 |
| 5,987,606 A | * | 11/1999 | Cirasole et al. | 713/201 |
| 5,987,611 A | * | 11/1999 | Freund | 713/201 |
| 5,996,011 A | * | 11/1999 | Humes | 709/225 |
| 6,052,788 A | | 4/2000 | Wesinger, Jr. et al. | 713/201 |
| 6,064,995 A | * | 5/2000 | Sansone et al. | 705/410 |
| 6,065,055 A | * | 5/2000 | Hughes et al. | 709/229 |
| 6,108,637 A | * | 8/2000 | Blumenau | |
| 6,205,551 B1 | * | 3/2001 | Grosse | 713/201 |
| 6,219,786 B1 | * | 4/2001 | Cunningham et al. | |
| 6,233,618 B1 | * | 5/2001 | Shannon | 709/229 |
| 6,275,942 B1 | * | 8/2001 | Bernhard et al. | 713/201 |
| 6,301,668 B1 | * | 10/2001 | Gleichauf et al. | 726/25 |
| 6,321,338 B1 | * | 11/2001 | Porras et al. | 713/201 |
| 6,324,647 B1 | * | 11/2001 | Bowman-Amuah | 713/201 |
| 6,366,956 B1 | * | 4/2002 | Krishnan | |
| 6,381,632 B1 | * | 4/2002 | Lowell | 709/224 |
| 6,389,472 B1 | * | 5/2002 | Hughes et al. | 709/229 |
| 6,442,686 B1 | * | 8/2002 | McArdle et al. | 713/151 |

(Continued)

FOREIGN PATENT DOCUMENTS

EP    0 909 072 A2    4/1999

(Continued)

*Primary Examiner* — Andrew Caldwell
*Assistant Examiner* — Christopher D Biagini
(74) *Attorney, Agent, or Firm* — Houston Eliseeva, LLP

(57) ABSTRACT

The present invention provides for a novel approach to protecting a system owner's system(s) from being exploited and providing involuntary assistance to a DOS attack. The present invention provides the protection by detecting and preventing undesirable or inappropriate network traffic from being sourced from a network domain. More specifically, a monitor/regulator is provided to monitor network traffic leaving a network domain. The monitor/regulator determines if undesirable/inappropriate network traffics are leaving the network domain based on the observed characteristics of the outbound and inbound network traffics. If it is determined that undesirable/inappropriate network traffics are leaving the network domain, the monitors/regulator, in one embodiment, at least warns system owners of the detection. In another embodiment, the monitors/regulator further issues regulation instruction(s) to boundary routing device(s) of the network domain (s), thereby preventing the network domain(s) from being exploited to source such undesirable/inappropriate network traffics.

15 Claims, 6 Drawing Sheets

U.S. PATENT DOCUMENTS

| | | | |
|---|---|---|---|
| 6,442,694 B1 * | 8/2002 | Bergman et al. | 726/22 |
| 6,453,345 B2 * | 9/2002 | Trcka et al. | |
| 6,484,203 B1 * | 11/2002 | Porras et al. | 709/224 |
| 6,510,458 B1 | 1/2003 | Berstis et al. | |
| 6,519,703 B1 * | 2/2003 | Joyce | 713/201 |
| 6,594,686 B1 * | 7/2003 | Edwards et al. | 709/203 |
| 6,606,710 B2 * | 8/2003 | Krishnan et al. | 713/201 |
| 6,650,777 B1 * | 11/2003 | Jensen et al. | |
| 6,651,099 B1 * | 11/2003 | Dietz et al. | 709/224 |
| 6,789,202 B1 * | 9/2004 | Ko et al. | 726/23 |
| 6,834,310 B2 * | 12/2004 | Munger et al. | 709/232 |
| 2002/0032871 A1 * | 3/2002 | Malan et al. | 713/201 |
| 2002/0032880 A1 * | 3/2002 | Poletto et al. | 714/4 |
| 2002/0036983 A1 * | 3/2002 | Widegren et al. | 370/230.1 |
| 2002/0095492 A1 * | 7/2002 | Kaashoek et al. | 709/224 |
| 2002/0103916 A1 * | 8/2002 | Chen et al. | 709/229 |
| 2003/0118029 A1 * | 6/2003 | Maher et al. | 370/395.21 |

FOREIGN PATENT DOCUMENTS

| | | |
|---|---|---|
| WO | WO 00/35130 | 6/2000 |

* cited by examiner

DETECTING AND PREVENTING UNDESIRABLE NETWORK TRAFFIC FROM BEING SOURCED OUT OF A NETWORK DOMAIN

BACKGROUND OF THE INVENTION

1. Field of the Invention

The present invention relates to the field of networking. More specifically, the present invention relates to the monitoring and regulation of routing devices of network domains to detect and prevent undesirable network traffic from being sourced out of the network domains.

2. Background Information

With advances in integrated circuit, microprocessor, networking and communication technologies, increasing numbers of devices, in particular, digital computing devices, are being networked together. Devices are often first coupled to a local area network, such as an Ethernet based office/home network. In turn, the local area networks are interconnected together through wide area networks, such as ATM networks, Frame Relays, and the like. Of particular interest is the TCP/IP based global inter-networks, Internet.

As a result of this trend of increased connectivity, increasing numbers of applications that are network dependent are being deployed. Examples of these network dependent applications include but are not limited to, email, net based telephony, world wide web and various types of e-commerce. Success of many of these content/service providers as well as commerce sites depends on the quality of service that they provide.

Unfortunately, the connectivity that makes it possible for these servers to provide the content/service, also makes it very easy for hackers to launch denial of service (DOS) attacks against these servers. Compounding the misfortunes is the fact that often times, innocent systems are exploited in assisting the attacks, without the system owners even knowing their systems are being exploited. The exploitation not only may affect the level of services delivered by the exploited systems, it may also leave the exploited systems vulnerable to liability for the damages inflicted on the servers being attacked.

To date, all the known methods and apparatuses that can assist a system owner in protecting his/her systems from being exploited are basically intrusion protection oriented. That is all the methods and apparatuses are substantially oriented towards keeping undesirable network traffics from entering a network domain and/or preventing unauthorized program execution on the owner's systems. As experience has demonstrated, none of these methods and apparatuses is perfect. From time to time, we have learned that hackers are able to get through. Thus, additional methods and apparatuses that can further prevent systems from being exploited and giving involuntary assistance to DOS attacks are desired.

SUMMARY OF THE INVENTION

The present invention provides for a novel approach to warning and/or protecting a system owner's system(s) from being exploited in providing involuntary assistance to a DOS attack. The present invention provides the protection by detecting and/or preventing undesirable or inappropriate network traffic from being sourced from a network domain. More specifically, a monitor/regulator is provided to monitor network traffic leaving a network domain. The monitor/regulator determines if undesirable/inappropriate network traffics are leaving the network domain based on the observed characteristics of the outbound and inbound network traffics. In one embodiment, if it is determined that undesirable/inappropriate network traffics are leaving the network domain, the monitors/regulator at least issues warnings, alerting system owners of the detection. In another embodiment, the monitor/regulator further issues regulation instruction(s) to boundary routing device(s) of the network domain(s), thereby preventing the network domain(s) from being exploited to source such undesirable/inappropriate network traffics.

In one embodiment, the determination is made based on differential characteristics of the outbound and inbound network traffics. In one embodiment, the differential characteristics are inferred from differences between observed aggregated statistics of the outbound and inbound network traffics. In another embodiment, the differential characteristics are aggregated from individual flow differences.

In one embodiment, the monitor/regulator monitors and/or regulates a single boundary routing device of a network domain. In another embodiment, the monitor/regulator monitors and/or regulates multiple boundary routing devices of a network domain. In yet another embodiment, the monitor/regulator monitors and/or regulates boundary routing devices of multiple network domains, with each network domain having one or more routing devices.

In one embodiment, the monitor/regulator is integrally implemented as a single component. In another embodiment, the monitor/regulator is distributedly implemented as separate components.

In one embodiment, the monitor/regulator is independently implemented, i.e. externally and remotely disposed outside of the monitored/regulated routing devices. In another embodiment, at least part of the monitor/regulator is integrally implemented with at least one of the monitored/regulated routing devices.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a processor based device, using terms such as receiving, analyzing, determining, instructing, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor includes microprocessors, micro-controllers, digital signal processors, and the like, that are standalone, adjunct or embedded.

Various operations will be described as multiple discrete steps in turn, in a manner that is most helpful in understanding the present invention, but, the order of description should not be construed as to imply that these operations are necessarily order dependent. In particular, these operations need not be performed in the order of presentation. The terms "routing devices" and "route" are used throughout this application, in the claims as well as in the specification. The terms as used herein are intended to be genus terms that include the conventional routers and conventional routing, as well as all other variations of network trafficking, such as, switches or switching, gateways, hubs and the like. Thus, unless particularized, the terms are to be given this broader meaning. Further, the description repeatedly uses the phrase "in one embodiment", which ordinarily does not refer to the same embodiment, although it may.

Overview

Figure 1:
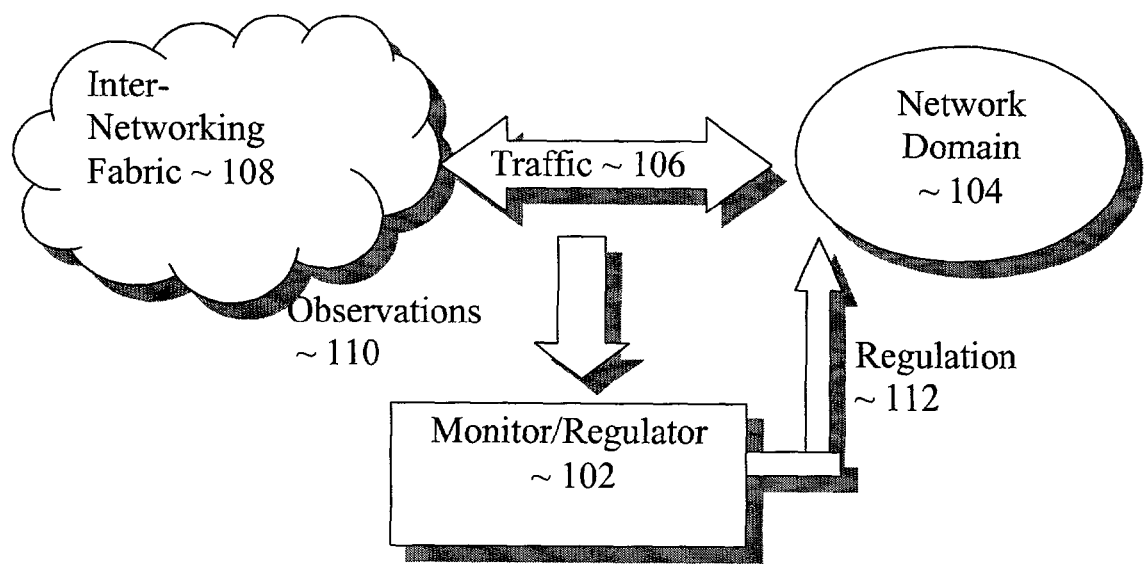
FIG. 1 illustrates an overview of the present invention, including a network traffic monitor/regulator of the present invention, in accordance with one embodiment.
Figure 2:
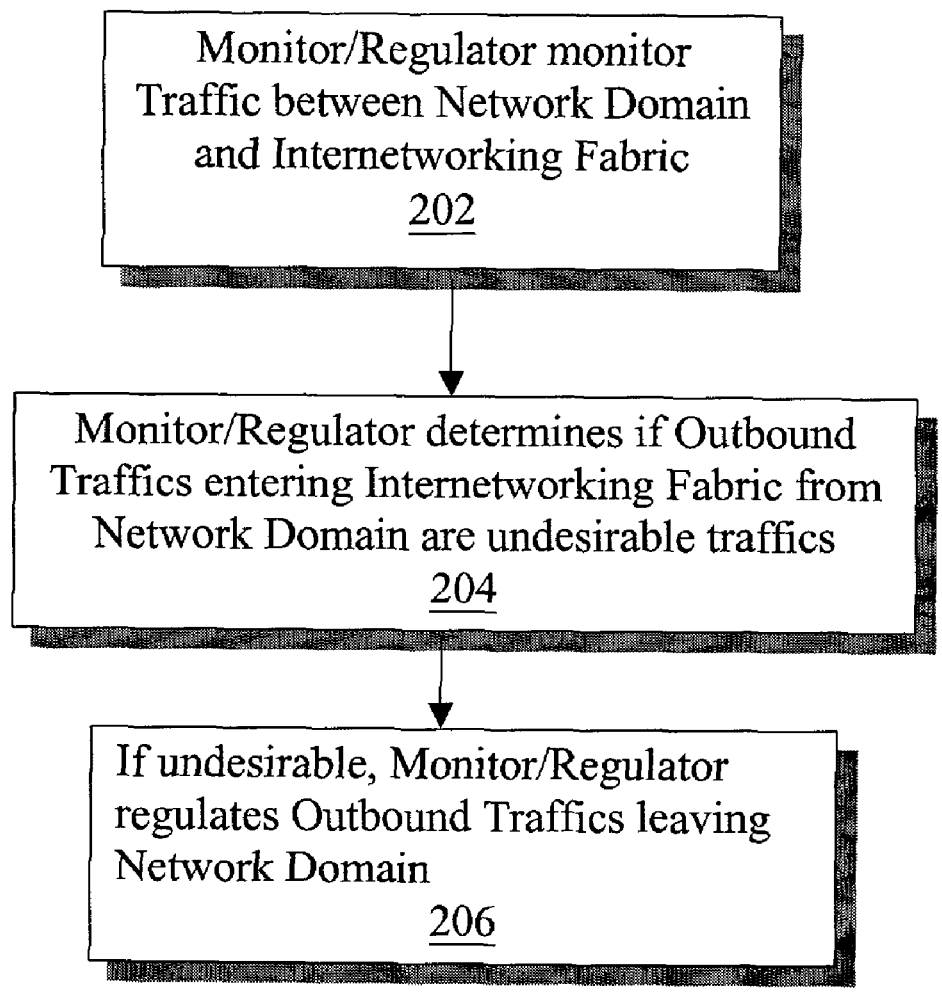
FIG. 2 illustrates a method view of the same invention, in accordance with one embodiment.

Referring now first to FIGS. 1-2, wherein two block diagrams illustrating a topological view and a method view of the present invention, in accordance with one embodiment, are shown. As illustrated by these figures, in accordance with the present invention, monitor/regulator 102 is advantageously provided to protect system owner of systems (not shown) located within network domain 104 from being exploited in providing involuntary assistance to a DOS attack against other systems (also not shown). Monitor/regulator 102 is equipped with logic to monitor or observe network traffics 106 routed between network domain 104 and internetworking fabric 108 (block 202), and based on observations 110, determines if undesirable or inappropriate network traffics are being sourced out of network domain 104 into internetworking fabric 108 (block 204). If so, in one embodiment, monitor/regulator 102 is further equipped to at least issue warnings alerting system owners of the detection. In another embodiment, monitor/regulator 102 is further equipped to regulate the boundary routing device or devices of network domain 104 (not shown), such as issuing regulation instructions 112 to the routing device(s) to prevent such undesirable or inappropriate network traffics from being sourced out of network domain 104 into internetworking fabric 108 (block 206), thereby reducing or eliminating the possibility of exploiting the systems of network domain 104.

Network domain 104 and internetworking fabric 108 are intended to represent a broad range of local or wide area networks known in the art. For examples, network domain 104 may be a local area network of an enterprise, and internetworking fabric 108 is the private internetworking fabric of the enterprise, or network domain 104 may be a wide area (such as a metropolitan area) network of an enterprise, and the internetworking fabric 108 is a public internetworking fabric (such as the Internet).

First Embodiment

Figure 3A:
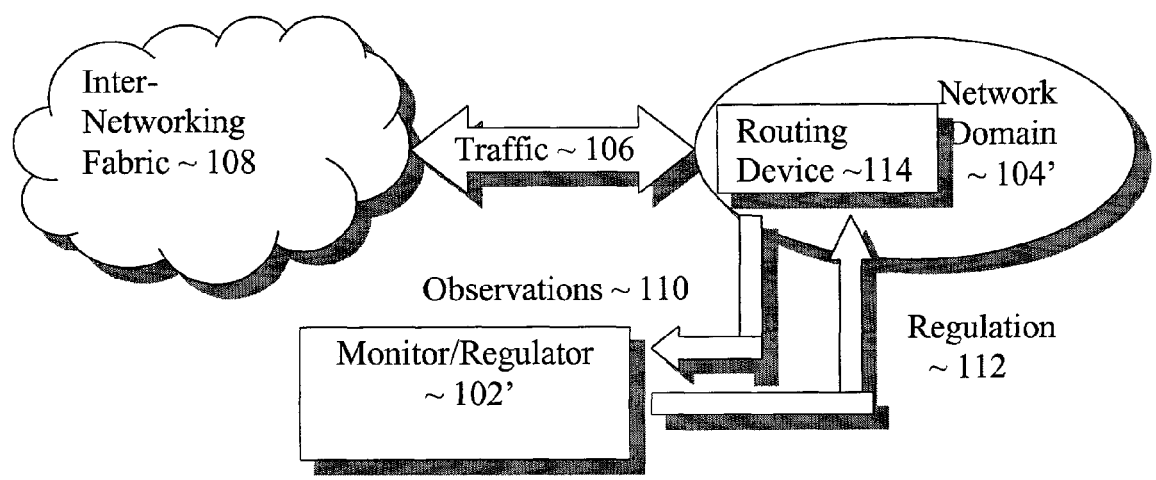
FIGS. 3a-3c illustrate the present invention in further details, in accordance with three embodiments.

FIG. 3a illustrates a first embodiment of the present invention, wherein network domain 104' has a single egress point for network traffics 106 to leave network domain 104' and enters internetworking fabric 108. As described earlier, monitor/regulator 102' monitors or observes network traffics 106' routed between network domain 104' and internetworking fabric 108 through routing device 114' (block 202), and based on observations 110', determines if undesirable or inappropriate network traffics are being sourced out of network domain 104' into internetworking fabric 108 through routing device 114' (block 204). If so, for one implementation of the illustrated embodiment, monitor/regulator 102' at least issues warnings alerting system owners of the detection. In another implementation, monitor/regulator 102' regulates routing device 114', issuing regulation instructions 112' to routing device 114' to "stop" routing certain traffic, to prevent the undesirable or inappropriate network traffics from being sourced out of network domain 104 into internetworking fabric 108 through routing device 114' (block 206). As a result, systems disposed inside network domain 104' are warned and/or protected from exploitation in providing involuntary assistance to DOS attacks against other systems.

In one embodiment, routing device 114' is of a type equipped to provide aggregate characteristic statistics on network traffics 106' routed. Examples of these aggregate characteristic statistics include but are not limited to statistics for traffics of particular types routed in both the outbound and inbound directions. [Outbound refers to network traffics routed from network domain 104' onto internetworking fabric 108', and inbound refers to the opposite.] Other examples of aggregate statistics include the number of bits per second (mbps), the number of packets per second, or the number of flows per second routed in each direction. [A flow may e.g. be a unique traffic conversation as indicated by a combination of source and destination addresses (and for certain protocols, port number also).] Further, the aggregate statistics may also include volume of data destined for specific destination addresses, lengths of packets, distribution of Time To Live values, and so forth. These other aggregated characteristic statistics may also be provided by network traffic type. In other words, aggregate characteristic statistics may simply be whatever data are necessary to provide the desired level of granularity in discerning undesirable versus desirable or appropriate versus inappropriate network traffics.

In alternate embodiments, for certain routing devices, if supported, the relevant data may additionally or alternatively be provided at the individual packet level (as opposed to being in the form of aggregate statistics) for all or selected flows. Similarly, any relevant data provided at the individual packet level may also be provided by network traffic type.

Examples of traffic types include but are not limited to TCP SYN and FIN packets. Network traffic types may further include Web, Real Networks, Secure Web, Other TCP, Other UDP, ICMP, TCP packets with ACK set, TCP packets without SYN set, and so forth. In general, any information carried as part of the packets may be used as typing criteria to divide the network traffic into different traffic types.

Numerous routing devices with such data providing capability are known in the art, including but are not limited to routing devices available from CISCO Systems, or 3COM, both of San Jose, Calif., or Juniper Networks of Sunnyvale, Calif.

Monitor/regulator 102' monitors/observes network traffics 106' by periodically requesting routing device 114' to provide it with the aggregate characteristic statistics of network traffics 106' routed. In one embodiment, monitor/regulator 102' periodically requests routing device 114' to provide at least the aggregate characteristic statistics for the number of TCP SYN and FIN packets routed. In one embodiment, monitor/regulator 102' uses traffic flow records such as Cisco's netflow (which is intended to produce one record for each flow) to gather information. In another embodiment, monitor/regulator 102' uses an access control list (ACL), and commands associated therewith, such as "access-list" and "show access-list" to gather up the relevant data. These commands, including their operations and constitutions, are known in the art. Additional information may be obtained from e.g. product literatures of various routing device manufacturers. In other embodiments, the relevant data may also be obtained through known network management services, such as Simple Network Management Protocol (SNMP), Remote Monitoring (RMON) or packet sampling (if one or more of these service are supported by the routing devices).

As described earlier, based on the observed characteristics of traffic 106', monitor/regulator 102' determines whether undesirable/inappropriate network traffics are being sourced out of network domain 104' onto internetworking fabric 108 through routing device 114'.

In one embodiment, monitor/regulator 102' makes the determination based at least on the relative difference between the number of outbound TCP SYN and FIN packets and the number of inbound response packets responding to these packets. Monitor/regulator 102' infers that undesirable/inappropriate traffics are being sourced out of network domain 104' if the difference exceeds a predetermined threshold. The predetermined threshold is empirically determined, and typically set at a relatively high level. If notwithstanding the relatively high level, the threshold is still exceeded, the excess suggests that the target destinations of the TCP SYN and FIN packets may be unable to respond due to a deliberate concentration of network traffic targeting one or more destinations. Accordingly a high likelihood exists then, a substantial amount of these TCP SYN and FIN packets are associated with a DOS attack.

In one embodiment, monitor/regulator 102' additionally or alternatively makes the determination based on the relative difference between the number of outbound TCP SYN and FIN packets destined for certain destinations, and the number of follow-on non-TCP SYN and FIN packets to the same destinations (typically representative of subsequent substantive requests from a destination after the initial connections established via the TCP SYN and FIN packets). Monitor/regulator 102' infers that undesirable/inappropriate traffics are being sourced out of network domain 104' if the difference exceeds a predetermined threshold. The predetermined threshold is also empirically determined. If the threshold is exceeded, the lack of follow-on substantive non-TCP SYN and FIN packets suggests that the target destinations of the TCP SYN and FIN packets may be just contacted to clog up the destinations. Accordingly, a high likelihood exists that, a substantial amount of these TCP SYN and FIN packets are associated with a DOS attack.

Those skilled in the art will appreciate that the above described detection and determination may be accomplished by reconfiguring the intrusion detection features equipped in many routing devices to operate in the outbound direction, as opposed to operating in the inbound direction as designed. Further, the second determination provides for earlier warning (if the inference is correct), although potentially it may be less accurate (especially if the destinations are still able to respond). The relative amount of the two different types of risk to assume, i.e. falsely concluding a DOS attack is underway, versus a failure to conclude a DOS is underway, is an application dependent decision.

In another embodiment where data are additionally or alternatively collected at the individual packet level, monitor/regulator 102' additionally or alternatively makes the determination based on the number of incomplete flows (e.g. outbound request packets not receiving reply packets). Similarly, a "large" number of incomplete flows, exceeding a predetermined threshold (empirically determined) suggests that the destinations of these incomplete flows are unable to respond, potentially due to the fact that they are being overwhelmed by a deliberate concentration of traffics against the destination. For this embodiment, monitor/regulator 102' additionally monitors for the response packets of the sampled flows.

Similarly, like kind of analysis on whether substantive follow-up flows exist subsequent to the initial flows establishing connections between systems of network domain 104' and contacted destinations may also be performed to infer whether undesirable/inappropriate network traffics are being sourced out the network domain 104'.

In addition to the earlier described aggregate or flow level analysis of TCP SYN and FIN packets, the earlier described analyses may also be performed to detect other types of "flood" attacks, including but are not limited to TCP NUL packets (with no flags set), RST packets, DNS requests (UDP port 53). Again each of these corresponding thresholds may be empirically determined.

Further, the earlier described analyses may similarly be performed to detect Smurf or Fraggle type of DOS attacks. For examples, the earlier described analyses may be performed to detect for outgoing ICMP echo reply packets (Smurf) or UDP echo "reply" packets (Fraggle) destined for a particular (victim) destination. Alternatively, the earlier described analyses may also be performed to detect for outgoing ICMP echo request packets (Smurf) or UDP echo "request" packets (Fraggle) destined for a "broadcast" address. However, these analyses may be performed, examining only the data for the outbound direction.

Thus, it can be seen the present invention may be employed to detect undesirable or inappropriate network traffics headed directly for the victim destinations or indirectly via third parties, as well as undesirable or inappropriate network traffics sourced directly out of the network domain or indirectly first originating from third parties (and subsequently going through the network domain).

In any event, if monitor/regulator 102' concludes that undesirable/inappropriate network traffics are not being sourced out of network domain 104', monitor/regulator 102' takes no further action. On the other hand, if monitor/regulator 102' concludes that undesirable/inappropriate network traffics are being sourced out network domain 104', in one embodiment, monitor/regulator 102' issues at least warnings alerting system owners of the detections. The warnings may be delivered in any one of a number of form factors, including electronic messages (delivered e.g. to control consoles, pagers and the like), faxes, audio messages, and the like. For the illustrated embodiment, monitor/regulator 102' further instructs routing device 114' to regulate the manner in which routing device 114' routes traffics 106' onto internetworking fabric 108, to attempt to "stop" these undesirable/inappropriate traffics from being sourced out of network domain 104'.

For examples, monitor/regulator 102' may instruct routing device 114' to drop certain types of packets, or packets destined for certain destinations. Alternatively, monitor/regulator 102' may instruct routing device 114' to lower the routing priority of these packets or limiting the amount of bandwidth being given for these packets, thereby slowing the rate or reducing the volume of these packets from being sourced out of network domain 104'. As a result, monitor/regulator 102' effectively "stops" the undesirable/inappropriate network traffics from being sourced out of network domain 104'. In one embodiment, monitor/regulator 102' uses interface related commands such as "show interface rate-limit" and "rate-limit" to regulate and de-regulate routing device 114'. The functions and constitutions of these commands are also known in the art, accordingly will not be further described.

While for ease of understanding, monitor/regulator 102" is shown as externally disposed away from routing device 114', the present invention may be practiced with monitor/regulator 102" implemented as a standalone component, independently and externally disposed away from routing device 114', or alternatively, the present invention may be practiced with monitor/regulator 102" integrally implemented in whole or in part, as a portion of routing device 114'.

Second Embodiment

Figure 3B:
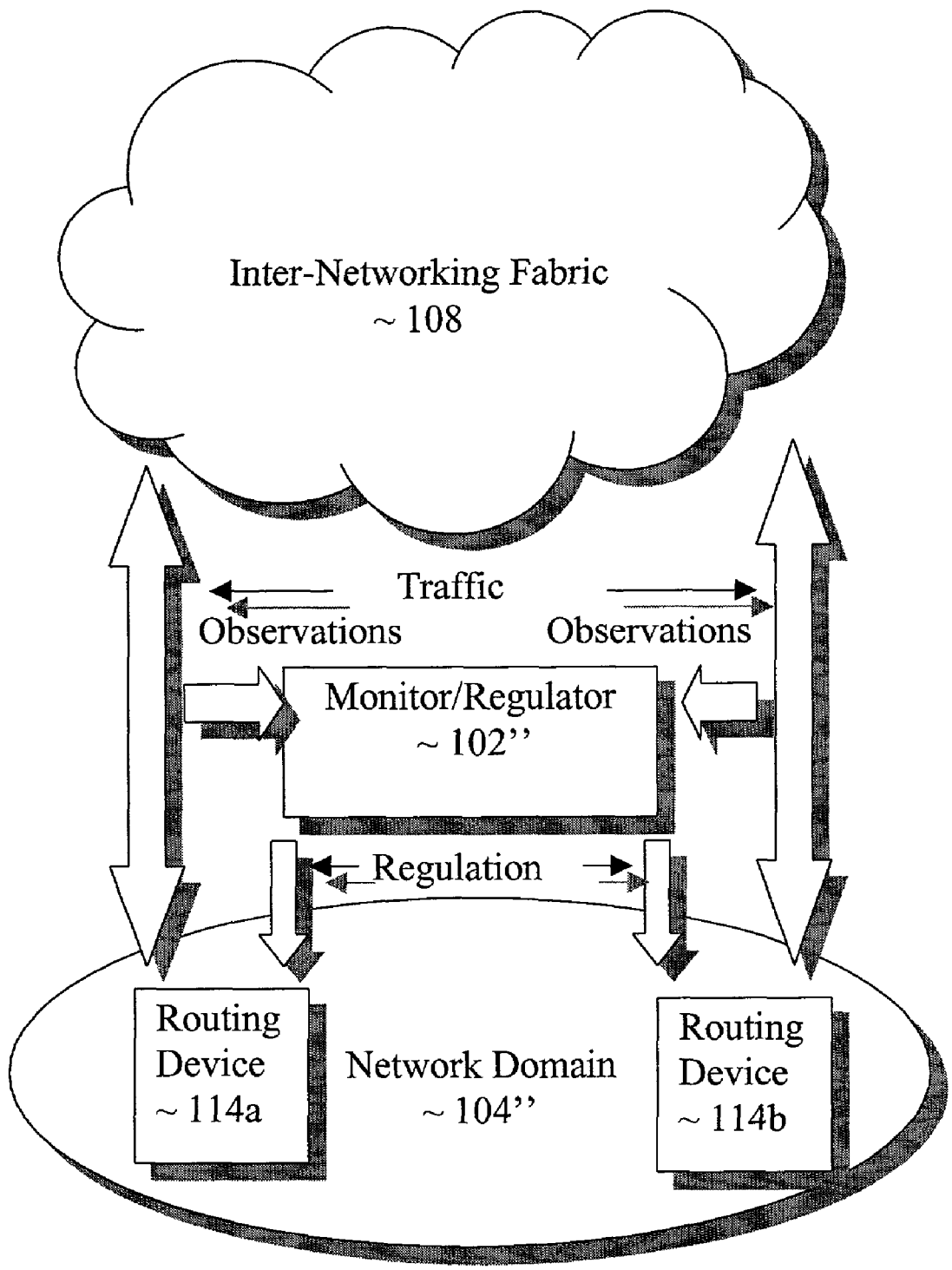

FIG. 3b illustrates a second embodiment of the present invention, wherein network domain 104" has multiple egress points for network traffics 106" to leave network domain 104" and enters internetworking fabric 108. As described earlier, monitor/regulator 102" monitors network traffics 106", determines if undesirable/inappropriate network traffics are being sourced out of network domain 104". If so, monitor/regulator 102" takes appropriate action to warn and/or "stop" the undesirable/inappropriate network traffics from being sourced out of network domain 104". As the earlier described embodiment, monitor/regulator 102" periodically requests characteristic data of network traffics 106" routed, except instead of making such requests of only one routing device, monitor/regulator 102" makes the periodic requests with all the boundary routing devices, such as routing device 114"*a* as well as routing device 114"*b*. Accordingly, systems disposed inside network domain 104" are protected from exploitation in providing involuntary assistance to DOS attacks against other systems, or their owners may at least be warned of such exploitations.

Similarly, when monitor/regulator 102" makes its determination on whether undesirable/inappropriate network traffics are being sourced out of network domain 104", monitor/regulator 102" takes all the data received into consideration. That is, when analyzing the data received from routing device 114"*a*, monitor/regulator 102" adds or otherwise factors into consideration the data received from routing device 114"*b*. Similarly, when analyzing the data received from routing device 114"*b*, monitor/regulator 102" adds or otherwise factors into consideration the data received from routing device 114"*a*. As described earlier, the data may be any one of the example data enumerated above, aggregated or at individual flow level.

By aggregating or otherwise taking into consideration characteristic data of network traffics sourced out of routing device 114"*a* as well as routing device 114"*b*, monitor/regulator 102" is made more sensitive and able to detect undesirable/inappropriate network traffics being sourced out of network domain 104", even though the decision metrics may not be exceeded at the individual boundary routing devices 114"*a* and/or 114"*b*.

In one embodiment, monitor/regulator 102" warns the owner(s) of the systems of network domain 104" of the detection. For the illustrated embodiment, monitor/regulator 102" determines the regulation instructions, if needed, separately for the different routing devices. That is, monitor/regulator 102" determines separate regulation instructions, if any, for the different routing devices. In alternate embodiment, monitor/regulator 102" may determine the regulation instructions collectively, and have the regulation instructions be applied to all routing devices uniformly.

As alluded to earlier, while for ease of understanding, monitor/regulator 102" is shown as externally disposed away from routing devices 114"*a* and 114"*b*, the present invention may be practiced with monitor/regulator 102" implemented as a standalone component, independently and externally disposed away from routing device 114', or alternatively, the present invention may be practiced with monitor/regulator 102" distributively, with at least a part of monitor/regulator 102" integrally implemented as a part of routing device 114"*a* and/or routing device 114"*b*, as long as the distributed pieces are communicatively coupled to each other and are able to cooperatively practice the present invention.

Third Embodiment

Figure 3C:
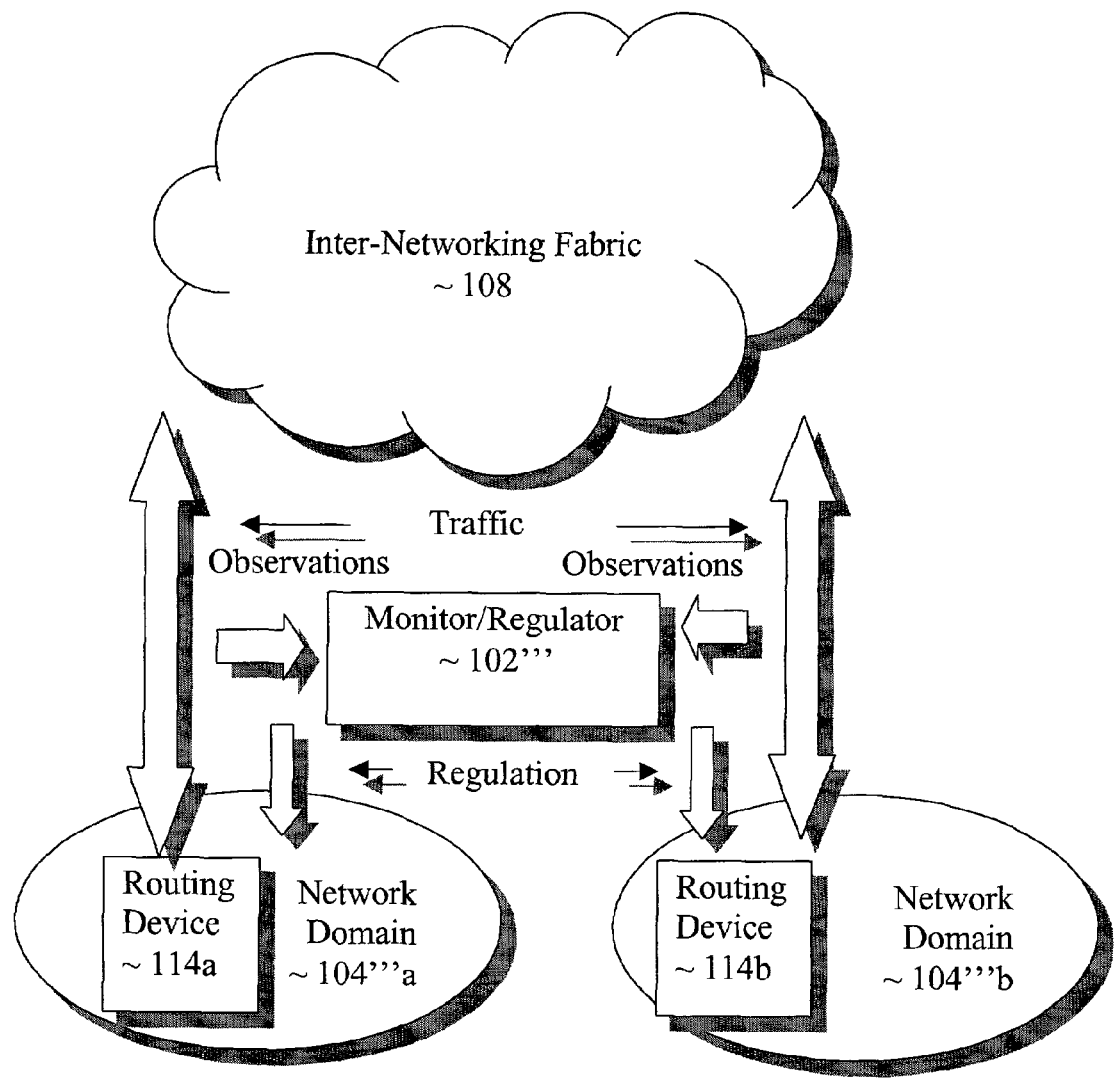

FIG. 3c illustrates a third embodiment of the present invention, wherein monitor/regulator 102''' monitors and regulates network traffics sourced out of multiple network domains, e.g. network domains 104'''*a* as well as network domains 104'''*b*. Each network domain 104'''*a*/104'''*b* has one or more egress points for network traffics 106''' to leave the particular network domains 104'''*a*/104'''*b*, and enters internetworking fabric 108. As described earlier, monitor/regulator 102''' monitors network traffics 106''', determines if undesirable/inappropriate network traffics are being sourced out of network domain 104'''*a* and/or 104'''*b*. If so, monitor/regulator 102''' takes appropriate action to warn and/or "stop" the undesirable/inappropriate network traffics from being sourced out of network domain 104'''*a* and/or 104*b*'''. Accordingly, systems disposed inside network domain 104" are protected from exploitation in providing involuntary assistance to DOS attacks against other systems, or their owners are at least alerted of their exploitations.

As the earlier described embodiment, monitor/regulator 102''' periodically requests characteristic data of network traffics 106''' routed, except instead of making such requests of only routing device or device(s) of one network domain, monitor/regulator 102''' makes the periodic requests with all the boundary routing devices, such as routing device 114'''*a* as well as routing device 114'''*b*, of all network domains 104'''*a* and 104'''*b*.

Similarly, when monitor/regulator 102''' makes its determination on whether undesirable/inappropriate network traffics are being sourced out of network domain 104'''*a* and/or 104'''*b*, monitor/regulator 102''' takes all the data received into consideration. That is, when analyzing the data received from routing device 114'''*a* of network domain 114'''*a*, monitor/regulator 102''' adds or otherwise factors into consideration the data received from other routing devices of the same or other network domains, such as routing device 114'''*b* of network domain 104'''*b*. Likewise, when analyzing the data received from routing device 114'''*b* of network domain 104'''*b*, monitor/regulator 102''' adds or otherwise factors into consideration the data received from other routing devices of the same or other network domains, such as routing device 114'''*a* of network domain 104'''*a*. As described earlier, the data may be any one of the example data enumerated above, aggregated or at individual flow level.

By aggregating or otherwise taking into consideration characteristic data of network traffics sourced out of other network domains, monitor/regulator 102''' is made even more sensitive, and is able to detect undesirable/inappropriate network traffics being sourced out network domain 104'''*a* and/ or network domain 104′″b, even though the decision metrics may not be exceeded at the individual routing devices and/or the individual network domains. For example, upon determining that undesirable network traffics are being sourced out of one domain, the threshold criteria for concluding that undesirable network traffics are being sourced out of another domain may be "lowered", as the probability of erroneously concluding that a domain is also being exploited to support the attack is substantially lower, given it has already been determined another domain is being exploited to source an attack. Accordingly, under this embodiment, the detection and prevention can advantageously leverage on information learned and/or determinations made for other domains.

In one embodiment, monitor/regulator 102′″ warns the owner(s) of the systems of network domain 104′″ of the detection. For the illustrated embodiment, monitor/regulator 102′″ determines the regulation instructions, if needed, separately for the different routing devices of the different network domains. That is, monitor/regulator 102′″ determines separate regulation instructions, if any, for the different routing devices of the different network domains. In an alternate embodiment, monitor/regulator 102′″ may determine the regulation instructions collectively, and have the regulation instructions be applied to all routing devices of all network domains uniformly.

As alluded to earlier, while for ease of understanding, monitor/regulator 102′″ is shown as externally disposed away from routing devices 114′″a and 114′″b, the present invention may be practiced with monitor/regulator 102′″ implemented as a standalone component, independently and externally disposed away from routing devices 114′″a and 114′″b, or alternatively, the present invention may be practiced with monitor/regulator 102′″ distributively implemented, with at least a part of monitor/regulator 102′″ integrally implemented as a portion of routing device 114′″a and/or routing device 114′″b, as long as the distributed pieces are communicatively coupled to each other and be able to cooperatively practice the present invention.

Example Host Digital System

Figure 4:
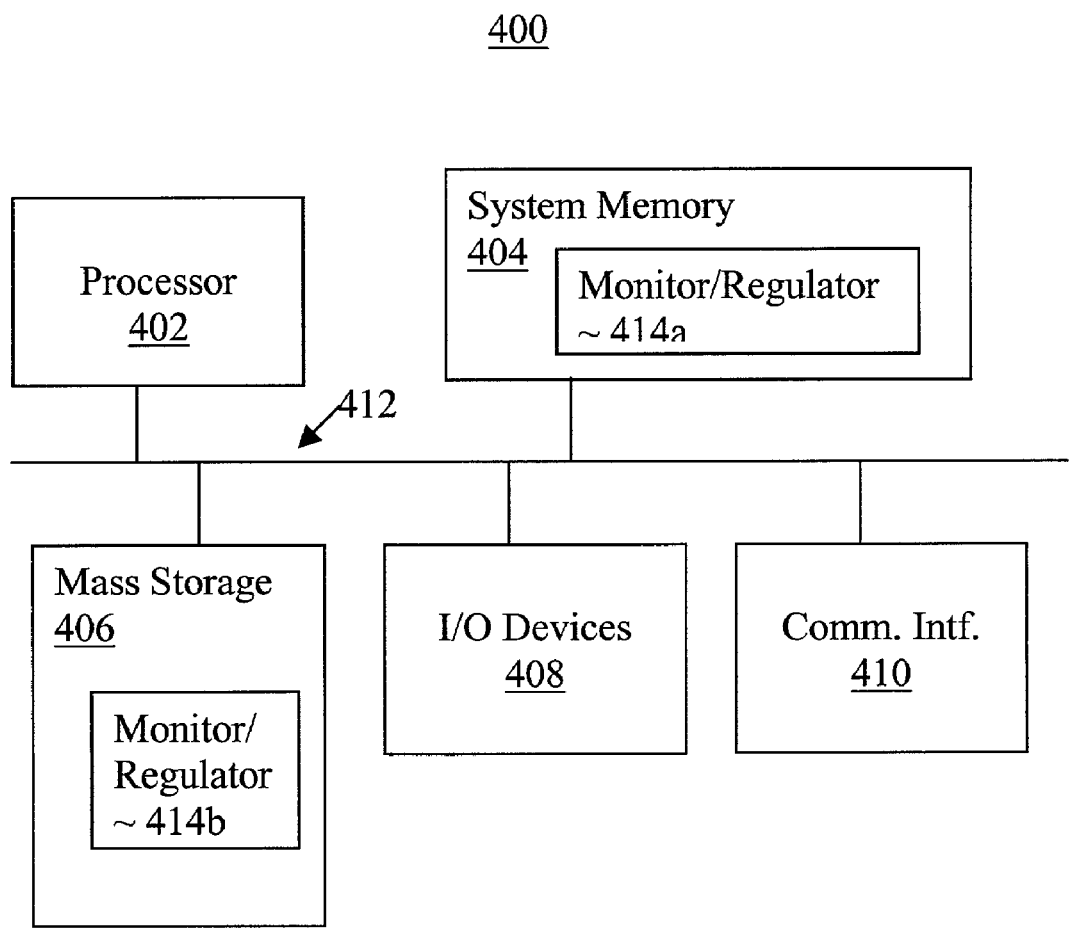
FIG. 4 illustrates an example digital system suitable for use to host a software implementation of the network traffic monitor/regulator of the present invention, in accordance with one embodiment.

FIG. 4 illustrates an example digital system suitable for use as a host to a software implementation of monitor/regulator, in accordance with one embodiment. As shown, digital system 400 includes processor 402, and system memory 404. Additionally, digital system 400 includes mass storage devices 406 (such as diskette, hard drive, CDROM and so forth), input/output devices 408 (such as keyboard, cursor control and so forth) and communication interfaces 410 (such as network interface cards, modems and so forth). The elements are coupled to each other via system bus 412, which represents one or more buses. In the case of multiple buses, they are bridged by one or more bus bridges (not shown). Each of these elements performs its conventional functions known in the art. In particular, system memory 404 and mass storage 406 are employed to store a working copy and a permanent copy of the programming instructions implementing the monitor/regulator teachings of the present invention. The permanent copy of the programming instructions may be loaded into mass storage 406 in the factory, or in the field, as described earlier, through a distribution medium (not shown) or through communication interface 410 (from a distribution server (not shown). The constitution of these elements 402-412 are known, and accordingly will not be further described.

CONCLUSION AND EPILOGUE

Thus, it can be seen from the above descriptions, a novel method and apparatus for protecting a system owner's systems from being exploited in providing involuntary assistance to DOS attacks, through detection and/or stopping undesirable/inappropriate network traffics from being sourced out of the owner's network domain has been described.

While the present invention has been described in terms of the above illustrated embodiments, those skilled in the art will recognize that the invention is not limited to the embodiments described. The present invention can be practiced with modification and alteration within the spirit and scope of the appended claims. For examples, as alluded to earlier, the present invention may be practiced with more or less sensors, more directors, and so forth. Thus, the description is thus to be regarded as illustrative instead of restrictive on the present invention.

What is claimed is:

1. A network comprising:
   a first network domain;
   a first routing device at a boundary between the first network domain and public internetworking fabric to route network traffic between the first network domain and the public internetworking fabric;
   a second routing device for routing network traffic out of and into the first network domain; and
   a monitor/regulator, either integrally disposed in said first routing device or coupled to the first routing device to monitor the network traffic routed by said first routing device and said second routing device by analyzing flow records, each describing a traffic conversation as indicated by a combination of source and destination addresses, received from the first routing device and the second routing device, the monitor/regulator determining if the first network domain is sourcing undesirable network traffic, including network traffic sourced directly out of the first network domain and also including network traffic sourced originally from third parties and subsequently going through the first network domain to the first routing device, the undesirable network traffic comprising a denial of service attack in which the undesirable network traffic is launched against a target network device in order to undermine the operation of that target network device by overwhelming the target network device with network traffic, out of or going through the first network domain based on the network traffic being routed by said first routing device and said second routing device,
   wherein said monitor/regulator makes said determination based at least in part on differential characteristics between request packets routed out of said first network domain and response packets routed into the first network domain based on aggregated network traffic routed by the first routing device and the second routing device, and wherein said monitor/regulator instructs the first routing device and said second routing device to lower a priority of the undesirable network traffic that is being sourced from or going through the first network domain,
   wherein said monitor/regulator monitors a second network domain, and
   wherein said monitor/regulator, upon making said determination, lowers threshold criteria it uses to conclude that undesirable network traffic is being sourced out of the second network domain.

2. The network of claim 1, wherein said monitor/regulator infers said differential characteristics based on aggregated statistics of said network traffic routed out of said first network domain by said first routing device and said second routing device, and aggregated statistics of said network traffic routed into the first network domain by said first routing device and said second routing device.

3. The network of claim 1, wherein said monitor/regulator generates statistics concerning destination addresses and determines whether the first network domain is sourcing or passing through undesirable network traffic based on said statistics.

4. The network of claim 1, wherein said monitor/regulator generates statistics concerning lengths of packets and determines whether the first network domain is sourcing or passing through undesirable network traffic based on said statistics.

5. The network of claim 1, wherein said monitor/regulator generates statistics concerning distributions of time to live values and determines whether the first network domain is sourcing or passing through undesirable network traffic based on said statistics.

6. The network of claim 1, wherein said monitor/regulator tracks differences between outbound transmission control protocol (TCP) synchronize (SYN) and finish (FIN) packets and inbound response packets and determines whether the first network domain is sourcing or passing through undesirable network traffic based on said differences.

7. The network of claim 1, wherein said monitor/regulator instructs said first routing device and said second routing device to slow the undesirable network traffic.

8. A network traffic regulation method comprising:
monitoring, by a monitor/regulator, network traffic routed by a first routing device of a first network domain;
monitoring, by the monitor/regulator, network traffic routed by a second routing device of said first network domain;
determining, by the monitor/regulator, if the undesirable network traffic is being sourced directly out of the first network domain or is sourced originally from third parties and subsequently passing through the first network domain to the first routing device, the undesirable network traffic comprising a denial of service attack in which the undesirable network traffic is launched against a target network device in order to undermine the operation of that target network device by overwhelming the target network device with network traffic, wherein the first network domain is determined to be sourcing or passing through undesirable network traffic by analysis of flow records describing traffic conversation, as indicated by a combination of source and destination addresses, received from the first routing device and the second routing device, which are positioned at a boundary between the first network domain and public internetworking fabric to route network traffic between the first network domain and the public internetworking fabric;
wherein said determining comprises determining based at least in part on differential characteristics between request packets routed out of said network domain and response packets routed into the network domain based on aggregated network traffic routed by the first routing device and the second routing device;
wherein said monitor/regulator instructs the first routing device and the second routing device to lower a priority of the undesirable network traffic that is being sourced from or passing through the first network domain and routed by said first network device and said second network device,
wherein said monitor/regulator monitors a second network domain, and
wherein said monitor/regulator, upon making said determination, lowers threshold criteria it uses to conclude that undesirable network traffic is being sourced out of the second network domain.

9. The method of claim 8, wherein said determining comprises inferring said differential characteristics based on aggregated statistics of said network traffic routed out of said first network domain by said first routing device and said second routing device, and aggregated statistics of said network traffic routed into the first network domain by said first routing device and said second routing device.

10. The method of claim 8, further comprising generating statistics concerning destination addresses and determining whether the first network domain is sourcing or passing through undesirable network traffic based on said statistics.

11. The method of claim 8, further comprising generating statistics concerning lengths of packets and determining whether the first network domain is sourcing or passing through undesirable network traffic based on said statistics.

12. The method of claim 8, further comprising generating statistics concerning distributions of time to live values and determining whether the first network domain is sourcing or passing through undesirable network traffic based on said statistics.

13. The method of claim 8, further comprising tracking differences between outbound TCP SYN and FIN packets and inbound response packets and determining whether the first network domain is sourcing or passing through undesirable network traffic based on said differences.

14. A network comprising:
a first network domain;
a second network domain;
a first routing device at a boundary between the first network domain and public internetworking fabric to route network traffic between the first network domain and the public internetworking fabric; and
said second network domain including a second routing device for routing network traffic out of and into the second network domain;
a monitor/regulator that monitors the network traffic routed by said first routing device and said second routing device by analyzing flow records describing traffic conversation as indicated by a combination of source and destination addresses received from the first routing device and the second routing device, and determines if undesirable network traffic is being sourced out of the first or the second network domains or is sourced originally from third parties and subsequently passes through the first or the second network domains, based on network traffic characteristics observed of network traffic routed through said first and second routing devices; the undesirable network traffic comprising a denial of service attack in which the undesirable network traffic is launched against a target network device in order to undermine the operation of that target network device by overwhelming the target network device with network traffic, out of or going through the first network domain or the second network domain, based on the network traffic being routed by said first routing device and said second routing device,
wherein said monitor/regulator makes said determination based at least in part on differential characteristics between request packets routed out of each network domain and response packets routed into each network domain based on aggregated network traffic routed by the first routing device and the second routing device, and wherein said monitor/regulator instructs one of said first routing device and said second routing device to lower a priority of the undesirable network traffic that is being sourced from or going through the first network domain or the second network domain; and wherein said monitor/regulator, upon determining that one of said first and second network domains is sourcing undesirable traffic, lowers threshold criteria it uses to conclude that undesirable network traffic are being sourced out of an other one of the first or the second network domains including being sourced originally from third parties and subsequently passing through the first or the second network domains.

15. A network comprising:

a network domain which is a local area network;

a routing device in the local area network at a boundary between the local area network and public internetworking fabric to route network traffic between the network domain and the public internetworking fabric; and a monitor/regulator, either integrally disposed in said routing device or coupled to the routing device, to monitor the network traffic routed by said routing device by analyzing flow records describing traffic conversation as indicated by a combination of source and destination addresses received from the routing device, the monitor/regulator determining if the network domain is sourcing undesirable network traffic, including network traffic sourced out of the network domain and also including network traffic sourced originally from third parties and subsequently going through the network domain to the routing device, the monitor/regulator generating statistics concerning destination addresses to determine whether the network domain is sourcing or passing through the undesirable network traffic, wherein said monitor/regulator instructs the routing device to lower a priority of the undesirable network traffic and/or slow the undesirable network traffic;

wherein the undesirable network traffic comprises a denial of service attack in which the undesirable network traffic is launched against a target network device in order to undermine the operation of that target network device by overwhelming the target network device with network traffic, out of the network domain, wherein said monitor/regulator makes said determination based on differential characteristics of network traffic routed out of or passing through said network domain relative to network traffic routed into said network domain and aggregates said differential characteristics based on differential characteristics between request packets routed out of said network domain, and response packets routed into the network domain and wherein said monitor/regulator instructs the routing device to lower a priority of the undesirable network traffic that is being sourced from or passing through the network domain, wherein said monitor/regulator monitors a second network domain, and wherein said monitor/regulator, upon making said determination, lowers threshold criteria it uses to conclude that undesirable network traffic is being sourced out of the second network domain.

* * * * *